No. 890,680. PATENTED JUNE 16, 1908.
W. & J. F. MITCHELL.
CARRIER.
APPLICATION FILED JUNE 24, 1907.

2 SHEETS—SHEET 1.

WITNESSES.

INVENTORS
William Mitchell,
John F. Mitchell,
By Benedict, Morsell & Caldwell
ATTORNEYS.

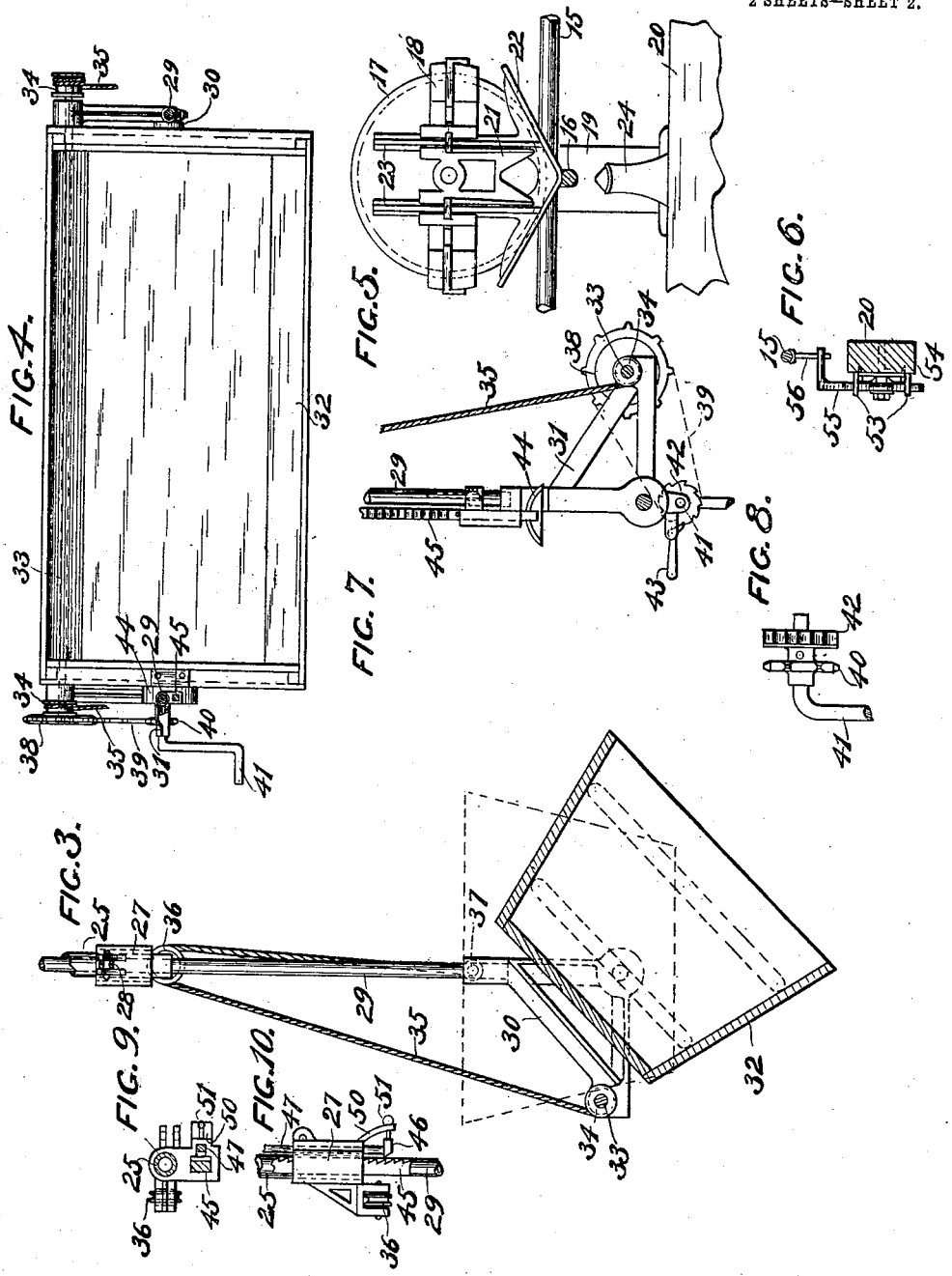

UNITED STATES PATENT OFFICE.

WILLIAM MITCHELL AND JOHN F. MITCHELL, OF MILWAUKEE, WISCONSIN.

CARRIER.

No. 890,680.      Specification of Letters Patent.      Patented June 16, 1908.

Application filed June 24, 1907. Serial No. 380,406.

*To all whom it may concern:*

Be it known that we, WILLIAM MITCHELL and JOHN F. MITCHELL, both residing in Milwaukee, in the county of Milwaukee and State of Wisconsin, have invented new and useful Improvements in Carriers, of which the following is a description, reference being had to the accompanying drawings, which are a part of this specification.

This invention has for its object to provide a carrier of the dumping type, which will automatically dump when the desired location is reached and in which the box may be raised or lowered without interfering with the automatic tripping feature.

Another object of this invention is to improve upon details of construction of a carrier of this type.

With the above and other objects in view the invention consists in the carrier herein claimed, its parts and combinations of parts and all equivalents.

Figure 2:
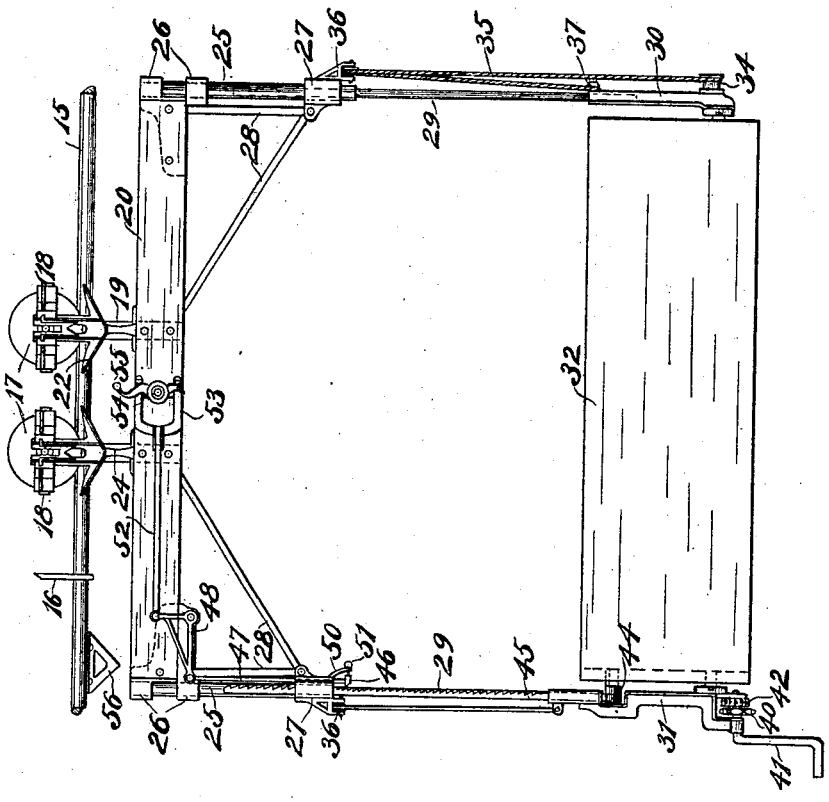
Figure 1:
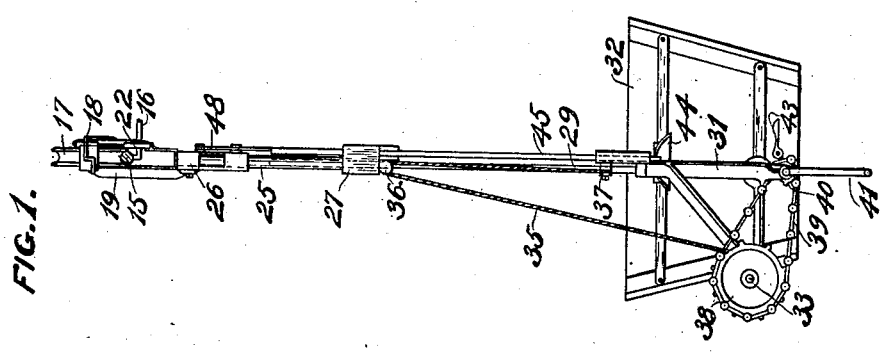

Referring to the accompanying drawings in which like characters of reference indicate the same parts in the several views; Figure 1 is an end elevation of a carrier constructed in accordance with this invention; Fig. 2 is a front elevation thereof; Fig. 3 is a transverse sectional view thereof with the box in its dumped position; Fig. 4 is a plan view of the box; Fig. 5 is a detail view of the trolley guard; Fig. 6 is an end elevation of the tripping device; Fig. 7 is a detail view of the box bracket and catch; Fig. 8 is a detail view of the crank sprocket and ratchet; Fig. 9 is a plan view of one of the guide brackets; and, Fig. 10 is an elevation thereof.

In these drawings 15 represents a track wire which is supported by hangers 16 as usual and on which the carrier is adapted to travel from place to place.

A pair of trolley wheels 17 are journaled in wheel frames 18 which are in the form of horizontal loops surrounding the wheels with standards 19 extending downwardly from one side thereof to connect with the carrier beam 20, and a guide projection 21 on the other side thereof coöperating with slots in the loop portion to form a guide for a V-shaped guard 22 having a pair of parallel arms T-shaped in cross section slidably mounted therein, the guard being slidable vertically to ride over the hangers 16 of the track wire and normally resting on the blocks 24 in their lower position.

At each end of the carrier beam 20 is a vertical guide tube 25 secured thereto by means of a bracket 26 and at the lower end of each of the tubes 25 is a guide bracket 27 connected by stay rods 28 with the brackets 26 and the wheel frame standards 19 to rigidly brace the guide tubes and securely hold them in their vertical position. Rods 29 slidably fit in the guide tubes 25 and carry at their lower ends box brackets 30 and 31 respectively to which is pivotally mounted a dumping box 32 in the usual manner. A shaft 33 is journaled between the box brackets 30 and 31 and has a drum 34 at each end with a rope or cable 35 secured thereto, the ropes or cables passing from these drums over sheaves 36 carried by the guide brackets 27 and then are connected to the box frames at 37. At one end the shaft 33 is provided with a sprocket wheel 38 which is connected by a chain 39 with a smaller sprocket wheel 40 on the shaft portion of a crank handle 41 which is journaled in bracket 31, there being also a ratchet 42 on said shaft portion engaged by a pawl lever 43. By turning the crank handle 41 the shaft 33 is driven through its chain connection therewith so as to wind the ropes or cables 35 on the drums 34 and thereby cause the box to rise, the rods 29 thereof telescoping within the guide tubes 25. The box may be left at its adjusted elevation without danger of its lowering because of the engagement of the pawl 43 with the ratchet 42, though the box may be lowered when desired by releasing the pawl 43 and permitting the crank handle to turn backwardly.

In order that an automatic trip may be provided to cause the box to dump on reaching the desired location and which will be operative in any vertical adjustment of the box, an arc shaped strike plate 44 is mounted on the box and has a recess to receive the end of a latch bar 45 which is guided in a tubular portion of the box frame 31 at one end and in a tubular portion of the guide bracket 27 near the other end and is adapted to be lifted by and engaged with the arc shaped strike plate 44 to latch the box in its upright position. The latch bar 45 is provided with ratchet teeth at one edge to be engaged by a dog 46 carried by a swinging rod 47 pivotally mounted on a bell crank lever 48 on bracket 26, the swinging rod passing through a slot of the guide bracket 27 to be capable of swinging toward or away from the latch bar.

A slotted curved projection 50 on the guide bracket 27 has a knob stem 51 of the dog 46 passing therethrough and serves as a cam for withdrawing the dog from engagement with the latch bar by the knob bearing thereon when the swinging bar 47 is moved downwardly, and likewise serves as a cam to be engaged by the dog for forcing the dog into engagement with the latch bar when the swinging bar 47 is moved upwardly. The bell crank lever 48 is connected by a rod 52 with a yoked member 53 which straddles a guide plate 54 and has projecting ends to engage with a trip lever 55 pivoted on the guide plate, said engagement being on opposite sides of the pivot of the trip lever, whereby the movement of the trip lever in either direction will cause it to engage one or the other of the projections of the yoked member and swing the bell crank lever to lift the swinging bar 47. A trip plate 56 is secured to the track wire at the place where it is desired to dump the load and extends beneath the wire to a position where it will engage the trip lever 55 when the carrier is passing and cause said trip lever to swing and lift the swinging bar 47 with the dog 46 which moves inwardly into engagement with one of the teeth of the latch bar 45 and lifts said latch bar therewith until it disengages from the strike plate and releases the box so that it may turn over and dump its contents. When the box is returned to its upright position and the carrier is moved away from the trip plate 56 the weight of the swinging bar 47 and the dog causes them to resume their lower position where the dog is out of engagement with the latch bar and said bar is therefore free to engage the strike plate and lock the box in its upright position for another operation. The automatic release of the box is accomplished whatever the elevation of the box may be, there being a sufficient number of teeth on the latch bar to be engaged by the dog in any position of the box.

What we claim as our invention is:

1. A carrier, comprising a traveling supporting frame, a box adjustably mounted thereon so as to be raised or lowered, a toothed latch bar for locking the box in its upright position, and an automatic tripping means carried by the traveling support for engaging the teeth of the latch bar to release the box in any adjustment of the box, said tripping means being normally out of engagement with the latch bar to permit of the vertical adjustments of the box.

2. A carrier, comprising a traveling supporting frame, rods slidably mounted thereon, a dumping box carried by the rods, means for elevating the dumping box, a toothed latch bar locking the box in its upright position, and an automatic tripping means on the supporting frame for engaging and moving the toothed latch bar in any adjustment of the box for releasing the box and permitting it to dump, said tripping means being normally out of engagement with the latch bar to permit of the vertical adjustment of the box.

3. A carrier, comprising a traveling supporting frame having vertical tubes, rods telescoping within the tubes, a dump box mounted on the rods, means for elevating the dump box, a toothed latch bar for locking the dump box in its upright position, a dog on the supporting frame for engaging the teeth of the latch bar, and automatic trip mechanism connected with the dog for moving the dog to release the latch bar in any elevation of the dump box, said dog being normally out of engagement with the latch bar to permit of vertical adjustments of the dump box.

4. A carrier, comprising a traveling supporting frame, rods slidably connected therewith, a dumping box supported by the rods, means for elevating the box, a toothed latch bar for locking the box in its upright position, a bell crank lever on the supporting frame, a swinging bar connected therewith, a dog carried by the swinging bar for engaging the teeth of the latch bar, means for causing the dog to engage and disengage the teeth of the latch bar, and means for swinging the bell crank lever for tripping the dumping box at any elevation thereof.

5. A carrier, comprising a supporting frame, rods slidably connected therewith, a dumping box mounted on the rods, means for elevating the dumping box, a bell crank lever on the supporting frame, a swinging bar on the bell crank lever, a dog carried by the swinging bar, a cam guide for the dog causing it to engage and disengage the teeth of the latch bar, and means for automatically swinging the bell crank lever for releasing the dumping box in any elevation thereof.

6. A carrier, comprising a traveling supporting frame, rods slidably connected therewith, a dumping box mounted on the rods, means for elevating the dumping box, a toothed latch bar locking the dumping box in its upright position, a bell crank lever on the supporting frame, a swinging rod connected therewith, a dog on the swinging rod, a knob stem on the dog, a slotted cam guide on the supporting frame through which the knob stem passes and serving to cause the dog to engage and disengage the teeth of the latch bar, and automatically operated means for swinging the bell crank lever for releasing the dumping box in any elevation thereof.

7. A carrier, comprising a traveling supporting frame, rods slidably connected therewith, a dumping box mounted on the rods, means for elevating the dumping box, a toothed latch bar locking the dumping box in its upright position, means on the supporting frame for engaging and moving the latch bar for disengaging the dumping box in any elevation thereof, a rod connected with said means, a yoked member on said rod, a trip lever pivoted between the arms of the yoke member and engaged thereby, and a trip plate in the path of the trip lever for causing it to automatically operate said means.

8. A carrier, comprising a carrier beam, means for supporting the carrier beam and permitting it to travel, brackets on the carrier beam, vertical tubes secured to the brackets, guide brackets mounted on the tubes, brace bars connecting the guide brackets with the beam, rods telescoping within the tubes, box brackets carried by the rods, a dumping box pivotally mounted on the box brackets, a shaft journaled in the box brackets, means for turning the shaft, drums carried by the shaft, sheaves on the guide brackets, ropes mounted on the drums and passing over the sheaves and secured to the box brackets, a toothed latch bar slidable in a guide bracket and a box bracket, a strike plate carried by the dumping box, and engaged by the latch bar, a bell crank lever pivotally mounted on one of the beam brackets, a swinging bar connected therewith, a dog on the swinging bar engaging the teeth of the latch bar, a cam on a guide bracket for forcing the dog into and out of engagement with the teeth of the latch bar, a rod connected with the bell crank lever, a yoked member secured thereto, a guide plate on the beam between the yoke arms, a trip lever mounted on the guide plate and engaged by the yoke arms on opposite sides of its pivot, and a trip plate in the path of the trip lever for causing it to swing and move the dog for releasing the latch bar and permitting the dumping box to discharge in any elevation thereof.

9. In a carrier, a supporting frame, a box carried thereby, a wheel frame mounted on the supporting frame and comprising a standard with a horizontal loop-shaped portion, a trolley wheel journaled in the loop-shaped portion of the wheel frame, a V-shaped wheel guard slidably mounted in the loop-shaped portion of the wheel frame by having a pair of parallel arms T-shaped in cross section slidably fitting in correspondingly shaped guides of the loop-shaped portion of the wheel frame, a projection on the loop-shaped portion extending downwardly between the arms of the wheel guard, and a block on the standard adapted to receive the V-shaped wheel guard when in its lower position.

In testimony whereof, we affix our signatures, in presence of two witnesses.

WILLIAM MITCHELL.
JOHN F. MITCHELL.

Witnesses:
A. L. MORSELL,
ANNA F. SCHMIDTBAUER.